United States Patent [19]
Yanase

[11] Patent Number: 5,722,863
[45] Date of Patent: Mar. 3, 1998

[54] ELECTRIC CONNECTION BOX

[75] Inventor: Takeshi Yanase, Shizuoka-ken, Japan

[73] Assignee: Yazaki Corporation, Tokyo, Japan

[21] Appl. No.: 732,893

[22] Filed: Oct. 17, 1996

[30] Foreign Application Priority Data

Oct. 18, 1995 [JP] Japan .................................. 7-269939

[51] Int. Cl.[6] .................................................. H01R 9/22
[52] U.S. Cl. .......................... 439/718; 439/271; 220/325
[58] Field of Search .................................. 439/718, 271, 439/136; 220/325, 806, 802, 803

[56] References Cited

FOREIGN PATENT DOCUMENTS 63-147875  9/1988  Japan .
4-137426  12/1992  Japan .

*Primary Examiner*—Neil Abrams
*Assistant Examiner*—T. C. Patel
*Attorney, Agent, or Firm*—Finnegan, Henderson, Farabow, Garrett & Dunner, L.L.P.

[57] ABSTRACT

An upper cover 2 is coupled to a junction block 4 by means of a securing member 5. A slant side wall 2h of a groove frame 2c of the upper cover 2 and a rib 1f at an opening rim portion 1e of a lower cover 1 are operated together, so that the opening rim portion 1e is bent to move an engaging protrusion 1c inside. The engaging protrusion 1c is jointed to an engaging concave portion 4a of the junction block 4, so that the lower cover 1, the upper cover 2 and the junction block 4 is secured all-in-one.

3 Claims, 2 Drawing Sheets

ELECTRIC CONNECTION BOX

BACKGROUND OF THE INVENTION

1. Field of the invention

The present invention relates to an electric connection box for waterproofing and protecting a junction block which is disposed in an engine room and so on of a vehicle.

2. Description of the Related Art

A conventional electric connection box is constructed as follows, which is well known. A lower cover has an inner space whose upper side is opened. An opening portion is cut from an upper rim to a bottom side on one side wall of the lower cover. A junction block is accommodated in an upper portion of the inner space of the lower cover. Electric components, for example, a fuse, a relay, a connector, etc. are mounted in the junction block. A space can be provided at a lower of the junction block in order to accommodate a wire harness, a harness connector and so on. An upper cover has a side wall portion, where an opening portion of the lower cover is closed. A waterproof packing is held by the engaging portion, so that the upper cover is engaged and covered from an upper side. A clip which is mounted at an outer side of the lower cover rotates, so that the clip is engaged in a receiving portion at an upper side of the upper cover. Accordingly, by compressing the packing, it is possible to waterproof and protect the junction block.

The kind of construction is disclosed in a laid-open Japanese Utility Publication No. 63-147875.

Additionally, an electric connection box which rotates a clip toward a horizontal direction is well known, as disclosed in a laid-open Japanese Utility Publication No. 4-137426.

Furthermore, a construction of the prior art is explained below. An upper cover remains engaged in an upper side of a lower cover in order to cover the lower cover. A clip at an outer side of the lower cover is rotated along the outer side of the lower cover. The clip is engaged in a receiving portion which is protruded at an outer side of the upper cover.

However, according to the former conventional electric connection box, it is necessary to provide a dimension a. The dimension a means a dimension that a dimension for protruding the clip is added to a dimension for rotating the clip on an outer side of the lower cover. According to the latter conventional electric connection box, it is also necessary to provide a dimension b, that is, a dimension for protruding the clip on an outer side of the lower cover. In either case, it is inevitable to make an electric connection box larger.

Thus, a boss portion is protruded at a bottom of an inner space of the lower cover. The upper cover is engaged in the lower cover in order to cover the lower cover. A screw member is passed through a bore passing through the upper cover, so that the screw member can pass through a junction block. Thereby, the screw member is jointed with the boss portion. Accordingly, since the dimension a and the dimension b are not required, it is possible to make an electric connection box smaller. However, due to the boss portion, it is difficult to use a space efficiently in order to accommodate a wire harness and a harness connector. Furthermore, a through portion where the screw member passes through is disposed in the junction block. Accordingly, there are caused following problems. That is, a plane packaging density of an inner circuit which is defined by a bass bar etc. reduces, and the number of layers increases.

SUMMARY OF THE INVENTION

It is an object of the present invention to provide an electric connection box having following characteristics. First, an upper cover is coupled to a junction block by a securing member, so that it is possible to obtain waterproof at an engaging portion where the upper cover is engaged in the lower cover, and to make an apparatus smaller. Next, the lower cover, the junction block and the upper cover are secured in order to be all-in-one, so that it is possible to enhance higher quality and to provide reliability.

According to one aspect of the invention, an electric connection box comprising:

- an lower cover having an inner space which is opened at an upper side, the lower cover formed with a shelf portion and an engaging protrusion at an inner side of the lower cover, and a rib at an outer side of an opening rim portion of the lower cover;
- a junction block accommodated in the inner space from an upper side of the lower cover, and being put on the shelf portion while the engaging protrusion remains engaged in an engaging concave portion at a side of the junction block; and
- an upper cover carrying a groove frame which is opened at a lower side on a rim of the upper cover, a waterproof packing being accommodated in the groove frame, an outer side of the groove frame obliquely extending, and packing being received in the groove frame;
- wherein the upper cover is engaged in the lower cover from an upper side of the lower cover, an opening rim portion of the lower cover and the rib being received in the groove frame, the upper cover being coupled to the lower cover side by a securing member, and the packing being compressed by an opening rim portion of the lower cover when the upper cover is pushed down;
- whereby a rib of the lower cover is pushed inside by an outer side wall of the groove frame, so that the opening rim portion is bent, an engaging protrusion of the lower cover being jointed to an engaging concave portion of the junction block.

An upper cover can be just coupled to a lower cover side by a securing member. Thereby, a side wall of a groove frame of the upper cover and a rib at an opening rim portion of the lower cover are operated together, so that the opening rim portion of the lower cover can be bent. Accordingly, an engaging protrusion is shifted inside, so that the engaging protrusion is jointed with an engaging concave portion at a side of a junction block. Therefore, the junction block can be secured. Accordingly, it is possible to secure the lower cover, the upper cover and the junction block all-in-one, to carry out a tight engagement between the upper cover and the lower cover, and, further, to enhance waterproof.

Furthermore, the engaging protrusion is pushed and moved in order to be jointed with the engaging concave portion. Accordingly, it is possible to minimize a dimension of an engaging protrusion from the opening rim portion, and to insert the junction block into the lower cover efficiently.

According to another embodiment of the present invention, the securing member is a screw member for jointing an upper cover to an upper wall of a junction block from an upper side of the upper cover.

Since the securing member is a screw member, the screw member is just jointed so that it is possible to absorb a dispersion of each component member. Thereby, it is possible to secure the upper cover, the junction block and the lower cover adequately, so that more enhanced water proof can be obtained.

According to still another embodiment of the present invention, an engaging portion is defined as being a generally triangle so that the engaging protrusion gets larger from an upper side to a lower side gradually.

An engaging protrusion is defined as being generally triangle. Accordingly, when accommodating the junction block in the lower cover, the junction block is just pushed down in an inner space of the lower cover from an upper direction. Therefore, the junction block can slide on an engaging protrusion in order to push an outer side. Thereby, it is possible to bend an opening rim portion of the lower cover outward easily, so that the engaging protrusion is fallen down in an engaging concave portion in order to be engaged. Thereby, it is possible to put the engaging protrusion on a shelf portion. Accordingly, it is possible to accommodate the junction block in the lower cover more efficiently.

DETAILED DESCRIPTION OF THE PREFERRED EMBODIMENTS

An embodiment of the present invention will be explained in detail with reference to FIG. 1 and FIG. 2 hereinafter.

Figure 1:
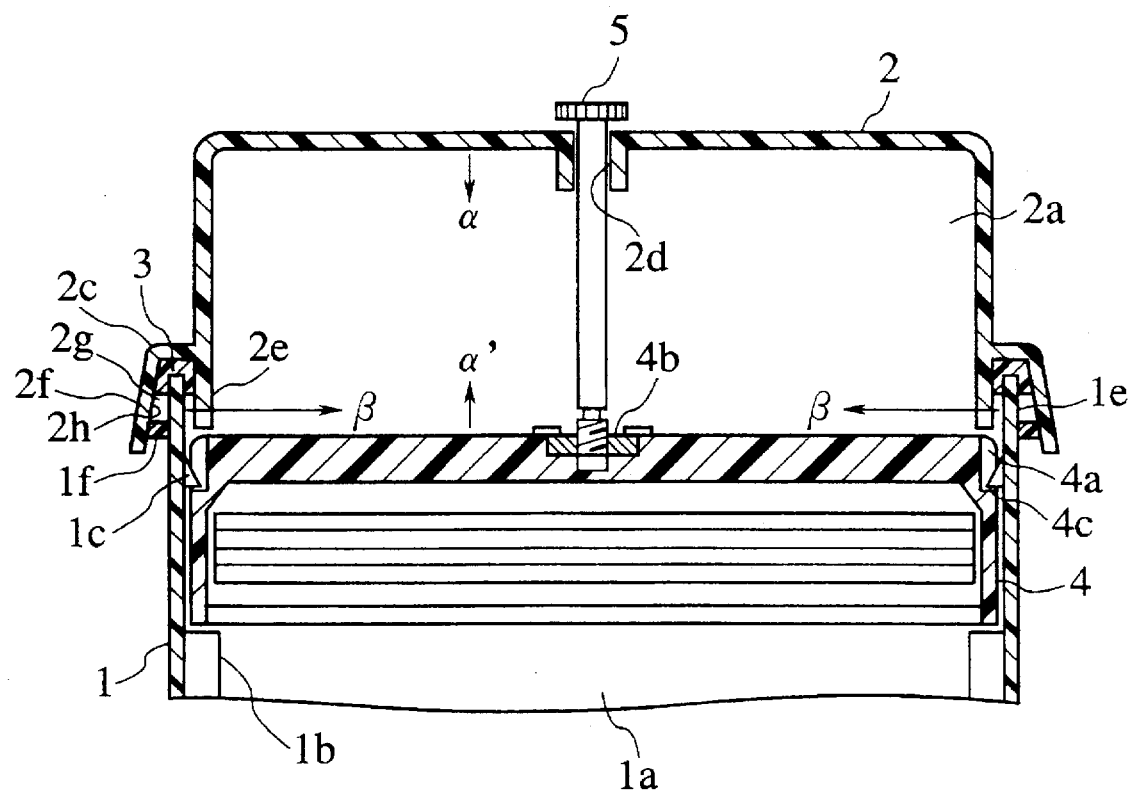
FIG. 1 is a cross-sectional view according to an electric connection box of an embodiment of the present invention, taken on section line I—I of FIG. 2.
Figure 2:
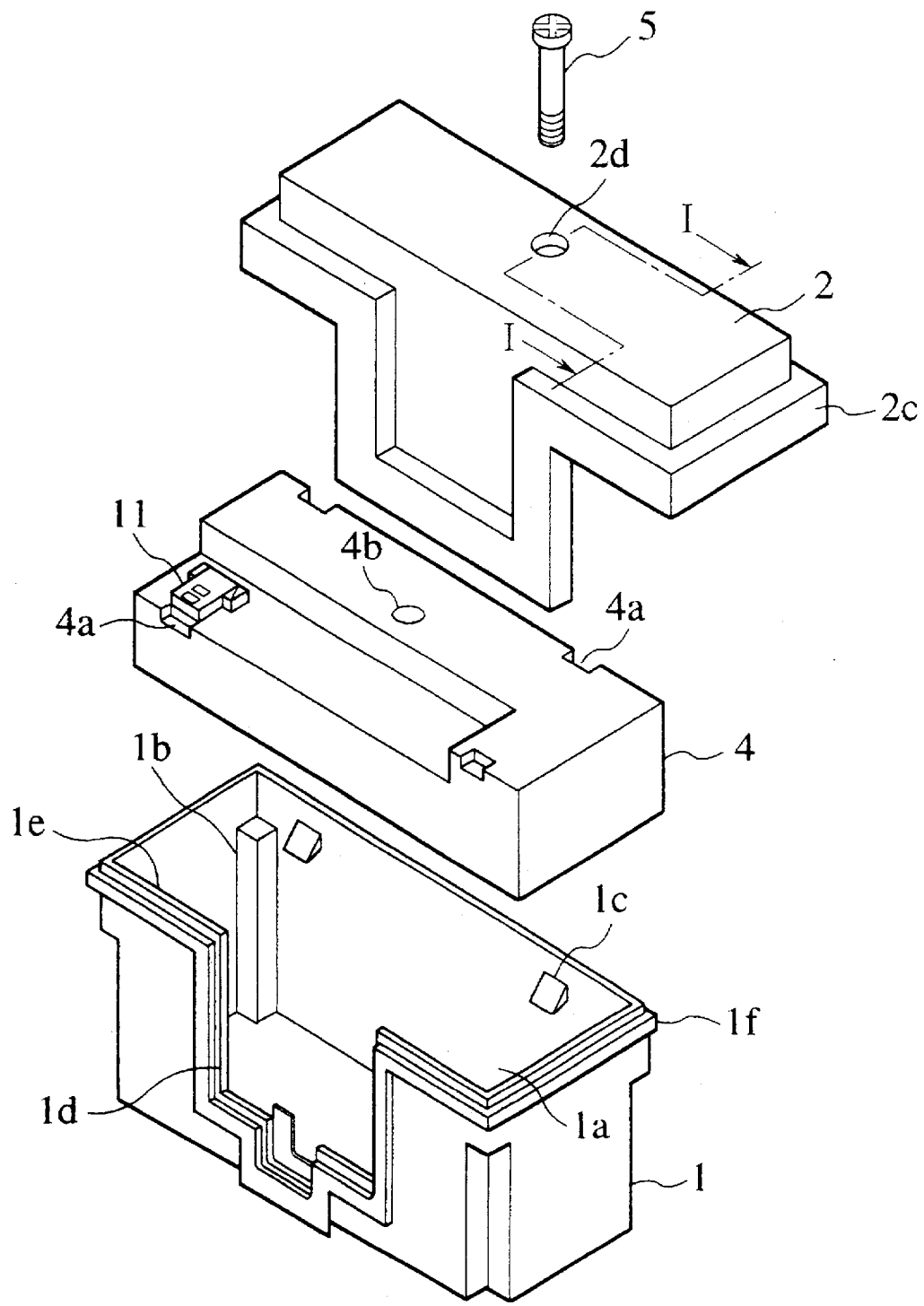
FIG. 2 is an exploded perspective view according to an electric connection box of an embodiment of the present invention.

As shown in FIG. 1 and FIG. 2, a numeral 1 denotes a lower cover. The lower cover 1 comprises an inner space 1a, a shelf portion 1b, a plurality of engaging portions 1c, an opening portion 1d, an opening rim portion 1e and a rib 1f. The inner space 1a is opened at an upper side. The shelf portion 1b is protruded at four corners of an inner side of the lower cover 1. The engaging protrusion 1c is protruded at an upper portion of a pair of inner side, each inner side faced at higher position than an upper side of the shelf portion 1b. The opening portion 1d is opened toward a bottom portion side from an upper rim on one side wall which defines the inner space 1a. The opening rim portion 1e is followed the opening portion 1d from an upper rim. The rib 1f is protruded at an outer side of the opening rim portion 1e.

According to the embodiment, the engaging protrusion 1c is defined so that a protrusion dimension gets larger from an upper side to a lower side gradually, whose shape is generally triangle.

A numeral 2 denotes an upper cover. The upper cover 2 comprises an inner space 2a, a side wall portion 2b, a groove frame 2c and a bore 2d. The inner space 2a is opened at a lower side. The side wall portion 2b is extended toward a lower direction from one side wall of the upper cover 2, so that the opening portion 1d of the lower cover 1 is closed. The groove frame 2c is defined in order to follow a rim of the side wall portion 2b from a lower rim. The bore 2d is passed through a center of an upper wall.

As shown in FIG. 1, the groove frame 2c comprises an inner flange 2e, an outer flange 2f and a groove 2g. The inner flange 2e is extended flatly from an inner rim The outer flange 2f is protruded outward from the inner flange 2e and is swelled in order to face toward the inner flange 2e. The groove 2g is defined so that the outer flange 2f and the inner flange 2e can receive the opening rim portion 1e and the 1f.

According to the embodiment, a side wall 2h is defined so that an outer side portion of the groove frame 2g can be slanted. A packing 3 which is defined by an elastic material, for example, a rubber, synthetic resin, etc. is attached inside of the groove 2g.

A numeral 4 denotes a junction block having a shape which the inner space 1a of the lower cover 1 can accommodate. The junction block 4 comprises a plurality of engaging concave portions 4a and a nut 4b. The engaging concave portions 4a are defined on front and back rims at an upper portion of the junction block 4, so that the engaging concave portions 4a are located in order to correspond to a plurality of engaging protrusions 1c of the lower cover 1. The nut 4b is recessed in a center portion on an upper wall of the junction block 4.

According to the embodiment, a numeral 5 denotes a securing member. The securing member 5 is inserted into the bore 2d from an upper side of the upper cover 2 in order to joint with the nut 4b of the junction block 4. A screw member is used so that the upper cover 2 is coupled to the junction block 4.

As described above, according to a construction of the embodiment, the junction block 4 is inserted into the inner space 1a from an upper side of the lower cover 1, so that the junction block 4 is pushed down. Thereby, a lower rim of the junction block 4 is sliding on a slant side wall of the engaging protrusion 1c, so that the opening rim portion 1e of the lower cover 1 is bent outward. Accordingly, the junction block 4 can be passed over.

By further pushing down, an end of the engaging protrusion 1c is sleeved at an outer side of the junction block 4 in order to pass over a lower step side 4c of the engaging concave portion 4a. At the same time, by a recovery elasticity of the opening rim portion 1e of the lower cover 1, the engaging protrusion 1c can be fallen down on and be engaged in the lower step side 4c of the engaging concave portion 4a. Accordingly, the junction block 4 can be put on the shelf portion 1b.

Thus, the groove frame 2c is composed of two vertical grooves which are located at right and left sides at the side wall portion 2b of the upper cover 2. The groove frame 2c receives the opening rim portion 1e and the rib 1f which are located at right and left sides of the opening portion 1d of the lower cover 1. The packing 3 in the groove frame 2c remains compressed at the opening rim portion 1e. The upper cover 2 is pushed down so that the junction block 4 and the lower cover 1 can be covered with the upper cover 2 from an upper direction. A rim of the upper cover 2, that is, the opening rim portion 1e and the rib 1f are received in a rim of the upper cover 2, that is, the groove frame 2c. Thereby, the opening rim portion 1e of the lower cover 1 can be contacted with the packing 3 in the groove frame 2c.

Furthermore, the securing member 5 is inserted into the bore 2d at an upper side of the upper cover 2 in order to joint with the nut 4b of the junction block 4. Thereby, the upper cover 2 is coupled to the junction block 4. The securing member 5 is jointed so that the upper cover 2 is pushed down, as shown by an arrow α in FIG. 1. Accordingly, the opening rim portion 1e of the lower cover 1 compresses the packing 3 in the groove frame 2c of the upper cover 2. As shown by an arrow β in FIG. 1, the rib 1f of the lower cover 1 is pushed inside and compressed at a slant side wall 2h of the groove frame 2c. The opening rim portion 1e of the lower cover 1 is bent inside, so that the engaging protrusion 1c is moved inside. While, as shown by an arrow α' in FIG. 1, the securing member 5 is jointed, so that the junction block 4 is acted by a force in order to rise upward. Thereby, an engaging portion between the lower step side 4c at the engaging concave portion 4a of the junction block 4 and the engaging protrusion 1c of the lower cover 1 is compressed and jointed. Accordingly, the lower step 4c can be engaged in the engaging protrusion 1c fixedly. Therefore, the lower cover 1, the junction block 4 and the upper cover 2 can be secured all-in-one.

More particularly, according to a construction of the embodiment, by using the securing member 5, the upper cover 2 is coupled to the junction block 4. Thereby, the slant side wall 2h of the groove frame 2c of the upper cover 2 is operated so that the opening rim portion 1e of the lower cover 1 can be bent. Accordingly, the engaging protrusion 1c is moved inside, so that an engaging portion between the engaging protrusion 1c and the junction block 4 is compressed and jointed. Thereby, the fixed engagement can be obtained. Accordingly, it is possible to minimize a protrusion of the engaging protrusion 1c from the opening rim portion 1e. Therefore, the junction block 4 can be inserted into the upper cover 2 easily.

Furthermore, by using the securing member 5, the upper cover 2 is coupled to an upper side of the junction block 4, so that an inner space at a lower side of the junction block 4 can be obtained. Accordingly, it is possible to connect and accommodate a wire harness and a harness connector efficiently. Furthermore, it is possible to use an accommodating space for efficiently.

It is not necessary to locate a protrusion of a securing member, for example, a clip and so on for coupling the lower cover 1 and the upper cover 2 to each outer side of them, respectively. Accordingly, it is possible to make an apparatus smaller.

Furthermore, the securing member 5 is composed of a screw member. Therefore, in accordance with a torque operation, it is possible to absorb a dispersion within a range of tolerance of each component member, for example, the lower cover 1, the upper cover 2, the packing 3, the junction block 4 and so on. Accordingly, it is possible to secure the lower cover 1, the upper cover 2 and the junction block 4 more tightly in order to obtain more waterproof.

Furthermore, the engaging protrusion 1c is defined as being generally triangle. Accordingly, the junction block 4 can be just pushed up to the inner space 1a from an upper direction of the lower cover 1. Thereby, a lower rim of the junction block 4 can slide on the engaging protrusion 1c in order to push the engaging protrusion 1c outward. Thereby, the opening rim portion 1e of the lower cover 1 can be bent outward easily, so that the engaging protrusion 1c is fallen down and engaged in the engaging concave portion 4a. Accordingly, it is possible to put the junction block 4 on the shelf portion 1b. Accordingly, it is possible to accommodate the junction block 4 in the lower cover 1 more efficiently.

The securing member 5 is not restricted to the screw member. The upper cover 2 may be coupled to the lower cover 1, by using an engaging means which uses a hook and a hook engaging groove.

What is claimed is:

1. An electric connection box comprising:

an lower cover having an inner space which is opened at an upper side, said lower cover formed with a shelf portion and an engaging protrusion at an inner side of said lower cover, and a rib at an outer side of an opening rim portion of said lower cover;

a junction block accommodated in said inner space from an upper side of said lower cover, and being put on said shelf portion while said engaging protrusion remains engaged in an engaging concave portion at a side of said junction block; and an upper cover carrying a groove frame which is opened at a lower side on a rim of said upper cover, a waterproof packing being accommodated in said groove frame, an outer side of said groove frame obliquely extending, and packing being received in said groove frame;

wherein said upper cover is engaged in said lower cover from an upper side of said lower cover, an opening rim portion of said lower cover and said rib being received in said groove frame, said upper cover being coupled to said lower cover side by a securing member, and said packing being compressed by an opening rim portion of said lower cover when said upper cover is pushed down;

whereby a rib of said lower cover is pushed inside by an outer side wall of said groove frame, so that the opening rim portion is bent, an engaging protrusion of said lower cover being jointed to an engaging concave portion of said junction block.

2. An electric connection box of claim 1, said securing member is a screw member for jointing an upper cover to an upper wall of a junction block from an upper side of said upper cover.

3. An electric connection box of claim 1, wherein said engaging portion is defined as being a generally triangle so that said engaging protrusion gets larger from an upper side to a lower side gradually.

* * * * *